United States Patent [19]

Zurwelle

[11] Patent Number: 4,954,026
[45] Date of Patent: Sep. 4, 1990

[54] SCREWDRIVER BIT AND CHUCK KEY RETAINER

[75] Inventor: Donald W. Zurwelle, Lutherville, Md.

[73] Assignee: Black & Decker, Inc., Newark, Del.

[21] Appl. No.: 474,193

[22] Filed: Feb. 2, 1990

[51] Int. Cl.⁵ ............................................. B23B 45/00
[52] U.S. Cl. ................. 408/241 R; 279/1 K; 206/373
[58] Field of Search ............. 279/1 K; 408/241 R; 81/16, 177.4, 490; 206/349, 372, 373, 377, 379, 443; 211/60.1, 69

[56] References Cited

U.S. PATENT DOCUMENTS

| | | | |
|---|---|---|---|
| 1,821,436 | 9/1931 | Holloway | 279/1 K |
| 4,240,771 | 12/1980 | Derbyshire | 408/124 |
| 4,449,559 | 5/1984 | Martinmaas | 145/62 |
| 4,508,221 | 4/1985 | Olson | 206/379 |
| 4,747,733 | 5/1988 | Kazawa | 408/241 R |
| 4,797,040 | 1/1989 | Hibbard | 408/241 R |

FOREIGN PATENT DOCUMENTS 7727325 2/1978 Fed. Rep. of Germany .
2849871 10/1980 Fed. Rep. of Germany .

OTHER PUBLICATIONS

Black & Decker Instruction Manual for ⅜" 7.2 Volt Cordless Dual Range Drills (Form #741272 dated Sep. 1988, p. 5).
Black & Decker's Parts Bulletin No. 104134, Catalog No. 1923, ⅜" VSR Dual Range Cordless Drill dated Oct. 1988.

Primary Examiner—Steven C. Bishop
Attorney, Agent, or Firm—Dennis A. Dearing; Charles E. Yocum; John D. Del Ponti

[57] ABSTRACT

An accessory storage retainer (11) is used for alternatively storing a screwdriver bit (13, 15) or a chuck key (17) having a handle (21) and a spindle (23). Retainer (11) comprises first and second parallel spaced cavities (33, 35) in base (25) for receiving either a screwdriver bit (13, 15) or a chuck key handle (21). A third cavity (49), which is disposed in base (25) perpendicular to and intersecting with cavities (33, 35), is for receiving chuck key spindle (23). A fourth cavity (81) may also be provided intermediate the first and second cavities for receiving another screwdriver bit (79). Retainer (11) is preferably embodied in a power screwdriver/drill (12), is used to store only screwdriver bits (13, 15, 79) when the power tool is equipped with a keyless chuck and is used to store a screwdriver bit (79) and a chuck key (17) when the tool (12) is equipped with a keyed chuck (29).

14 Claims, 4 Drawing Sheets

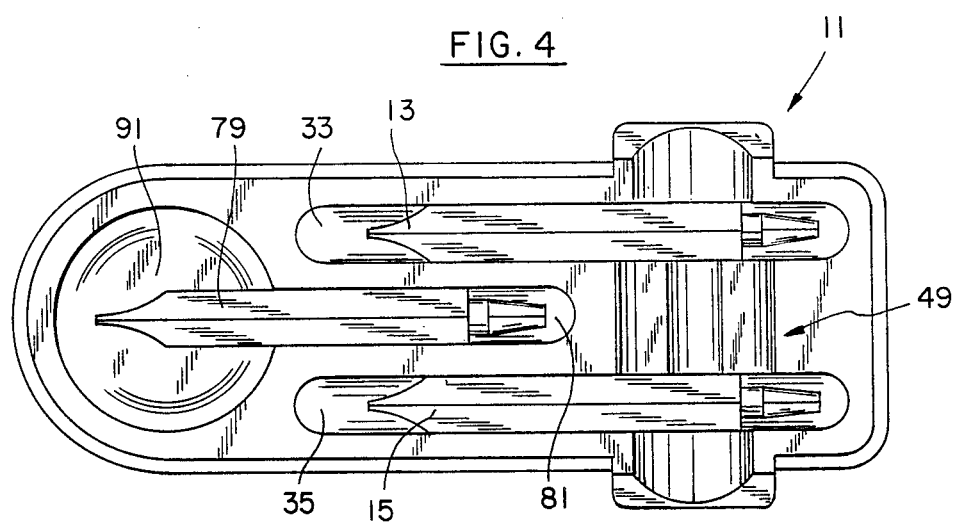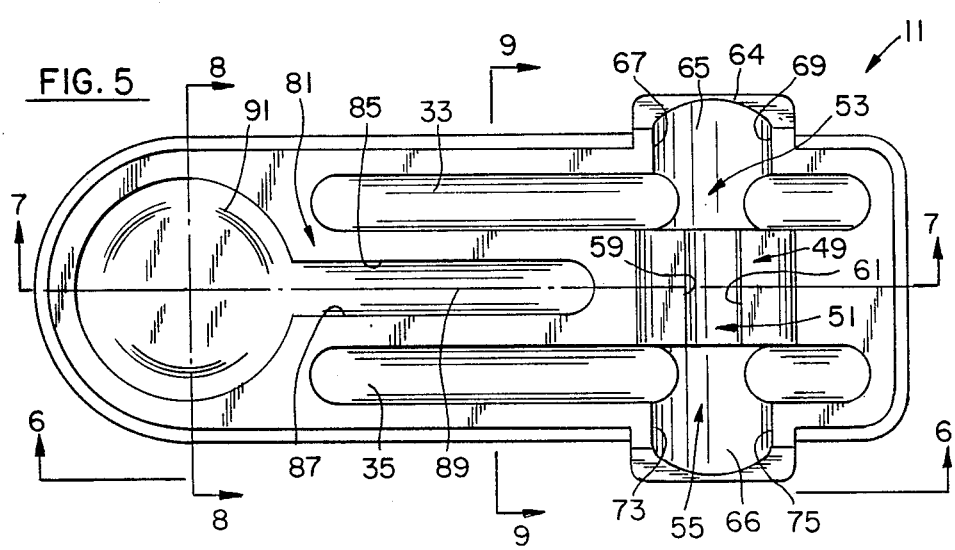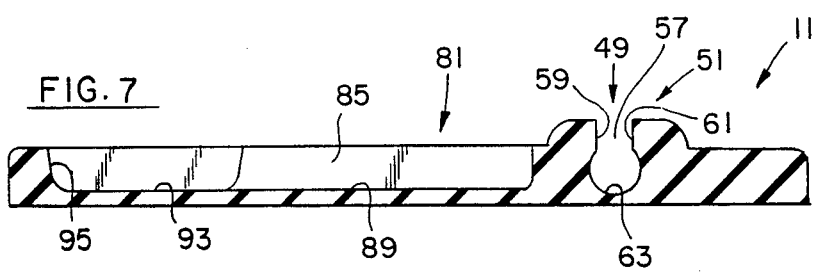

SCREWDRIVER BIT AND CHUCK KEY RETAINER

FIELD OF THE INVENTION

This invention relates to accessory storage retainers for tools and more particularly to storage retainers for screwdriver bits and chuck keys and to a power tools having such retainers.

BACKGROUND OF THE INVENTION

In the design of power tools, storage retainers are commonly provided for accessories such as a drill bit, a screwdriver bit, a chuck key and other hand tools used in servicing of the tool. The retainer may provide storage space for one or more of each item or a combination of these items. Because the space which may be utilized for a storage retainer in a power tool is limited it is desirable to improve the versatility and economize the space allocated to the storage of accessories. For example, in a power screwdriver/drill equipped with a keyed chuck it is desirable to provide storage for screwdriver bits and a chuck key for operation of the keyed chuck. Depending on operator preference, power screwdriver/drills may also be equipped with a keyless chuck (which is opened and closed without a chuck key thereby eliminating any need to store a chuck key). Accordingly, it is desirable to provide a low cost, simple retainer for accessories with improved versatility and compactness which may be used with a power screwdriver/drill equipped with either a keyed or keyless chuck.

SUMMARY OF THE INVENTION

The present invention is particularly concerned with a storage retainer which has storage cavities which may accommodate either a screwdriver bit or a chuck key.

In accordance with one aspect of the invention, as embodied and described herein, a retainer is provided for alternatively storing a screwdriver bit or a chuck key having two portions. The retainer comprises a base and first and second parallel spaced cavities in the base for receiving either a screwdriver bit or one chuck key portion. A third cavity which is perpendicular to and intersecting with the first and second cavities is provided for receiving the other chuck key portion.

Preferably the third cavity is for receiving the key spindle and gear and has three segments. The first segment for receiving the spindle has an opening defined by a pair of opposed sidewalls. The second segment for receiving the gear is adjacent to one end of the first segment and has an opening defined by opposed sidewalls. The third segment for optionally receiving the gear is adjacent to the other end of the first segment and has an opening defined by opposed sidewalls. For ease of manipulation of screwdriver bits stored in the first and second cavities and alternatively for receipt of a chuck key gear when a key spindle is stored in the third cavity, the openings of the second and third segments of the third cavity are substantially wider than the first segment opening.

Preferably a means is provided for retaining a chuck key in the third cavity and in either of the first or second cavities. A preferred retaining means is constituted by the central segment of the third cavity. To partially enclose and provide a snap fit for the chuck key spindle, the opposed sidewalls of the central segment of the third cavity are spaced apart a smaller distance at the opening than near the bottom of the third cavity.

Preferably for compactness and ease of manipulation of the chuck key, the third cavity begins at a location spaced from the first cavity, extends from that location across intermediate portions of the first and second cavities and ends at a second location spaced from the second cavity.

For storing an additional screwdriver bit, a fourth cavity may be provided in the base intermediate the first and second cavities.

In accordance with another aspect of the invention, the retainer may be embodied in a power tool, preferably, having a main body portion and a handle portion. The retainer is preferably inset into a top wall of the main body.

Additional objects and advantage of the invention will be apparent from the detailed description of the preferred embodiment, the appended claims, the accompanying drawings and the practice of the invention.

BRIEF DESCRIPTION OF THE DRAWINGS

The accompanying drawings which are incorporated in, and constitute a part of, this specification illustrate one embodiment of the invention and together with the description serve to explain the principles of the invention.

FIG. 4 is a top plan view of the retainer shown in FIG. 1 illustrates another application of the retainer.

FIG. 5 shows a plan view of the retainer shown in FIG. 1 with no accessories stored therein.

FIG. 7 is a longitudinal cross-sectional view of the retainer taken along line 7—7 of FIG. 5.

DESCRIPTION OF THE PREFERRED EMBODIMENT

Figure 1:
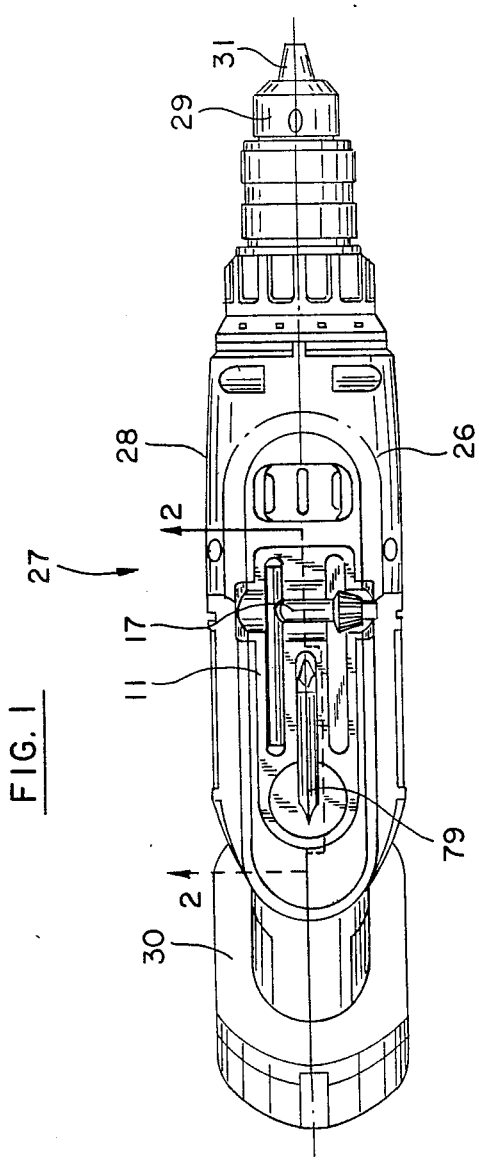
FIG. 1 is a top plan view of a power tool and an accessory storage retainer in accordance with the features of the invention.
Figure 2:
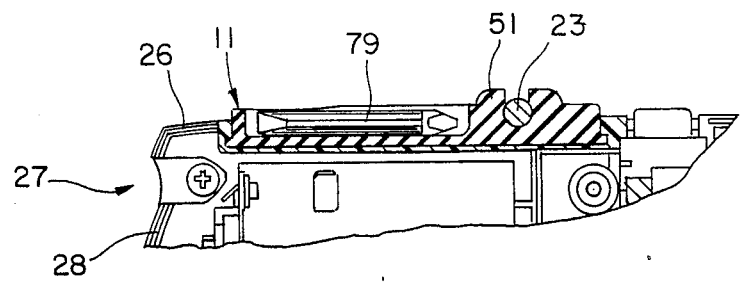
FIG. 2 is a fragmentary cross-sectional view of the tool and retainer taken along line 2—2 in FIG. 1.
Figure 3:
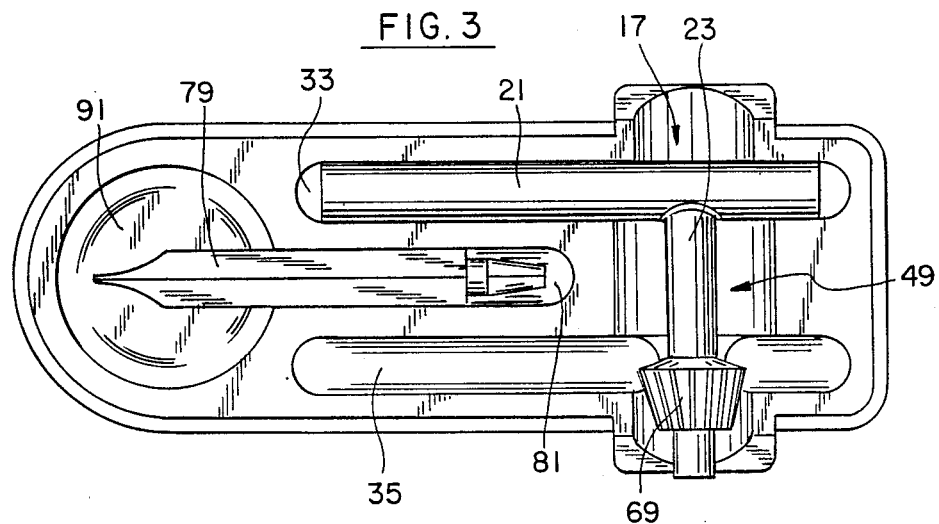
FIG. 3 is a top plan view of the retainer shown in FIG. 1 illustrating one application of the retainer.
Figure 6:
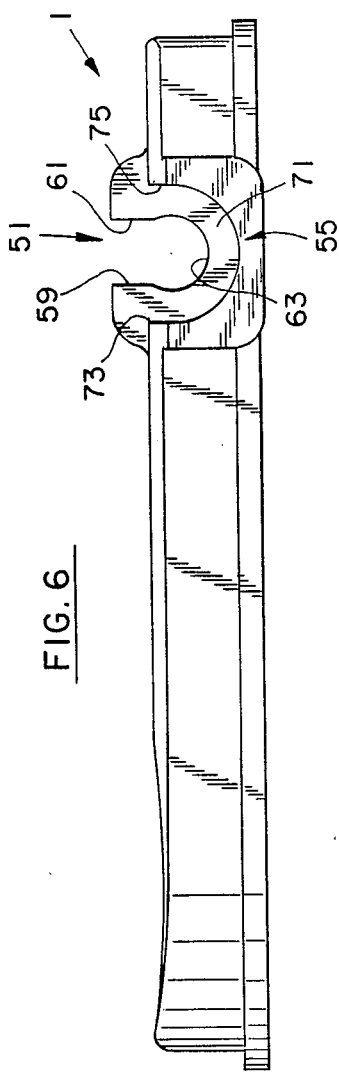
FIG. 6 is a side elevational view of the retainer taken along line 6—6 of FIG. 5.

The preferred embodiment of the invention is illustrated in FIGS. 1-3 with further detail thereof being shown in FIG. 4-9.

The preferred embodiment is a chuck key and screwdriver bit retainer for storage of a chuck key and screwdriver bits and is used in a power tool such as a power screwdriver/drill.

In accordance with the invention, a retainer for alternatively storing a screwdriver bit or a chuck key having two portions comprises a base. As embodied herein and shown in FIGS. 1-4, a retainer 11 is provided for alternatively storing a pair of conventional hexagonal screwdriver bits 13, 15 (FIG. 4) or a conventional chuck key 17 (FIG. 3) having two portions: a handle 21 and a spindle 23. As depicted in FIGS. 1, 2, retainer 11 comprises a thin, elongated, resilient base 25 which is preferably inset in a top wall 26 of the motor housing 28 of a power screwdriver/drill 27. Base 11 is preferably molded in one piece of neoprene synthetic rubber with a durometer of 85±5D. Screwdriver/drill 27 also includes a handle 30 extending from housing 28 and may be equipped either with a conventional keyed chuck 29 as depicted or a conventional keyless chuck (not shown). Screwdriver/drill 27 may be operated in two modes a screwdriving mode and a drilling mode. A suitable and preferred screwdriver/drill for incorporating retainer 11 is disclosed in U.S. patent application Ser. No. 07/462,369, filed Jan. 9, 1990, in the name of Daniel M. Elligson and assigned to the assignee of the invention herein, the disclosure of which is hereby incorporated by reference herein. When tool 27 is equipped with a keyed chuck and it is necessary to load or exchange screwdriver bits and drill bits, chuck key 17 is used to tighten and loosen jaws 31. In this case, retainer 11 may be used to store a chuck key 17 as depicted in FIG. 3. When tool 27 is equipped with a keyless chuck, no chuck key is required to tighten and loosen jaws to load or exchange drill bits and screwdriver bits. In this case there is no need to store or retain chuck key 17 in retainer 1!. Accordingly, as will be apparent, retainer 11 may be utilized to store screwdriver bits 13, 15 as depicted in FIG. 4.

Figure 9:
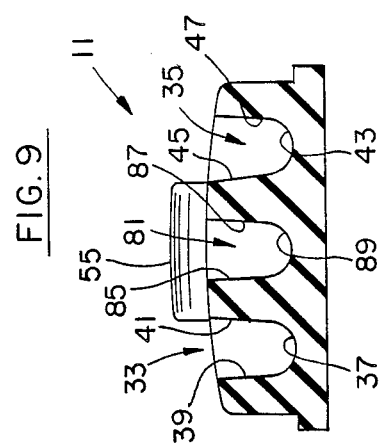
FIG. 9 is a transverse cross-sectional view of the retainer taken along line 9—9 of FIG. 5.
Figure 8:
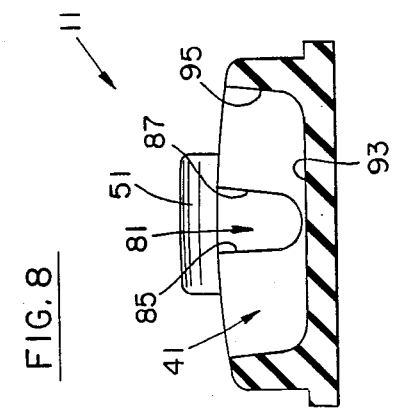
FIG. 8 is a transverse cross-sectional view of the retainer taken along line 8—8 of FIG. 5.

In accordance with the invention, the retainer further comprises first and second parallel spaced cavities in the base for receiving either a screwdriver bit or one chuck key portion. As embodied herein and as shown in FIGS. 3 and 4 a first and second parallel spaced cavities 33, 35 are provided in base 25 for receiving at least one screwdriver bit 13, 15 or a chuck key portion namely, handle 21. When cavities 33, 35 are used for storage of screwdriver bits, a screwdriver bit may be stored in only one of cavities 33, 35 if desired. When cavities 33, 35 are used for receiving a chuck key handle 21, handle 21 may be alternatively received in cavity 33 or cavity 35. As shown in FIG. 9, cavity 33 comprises an arcuate bottom 37 and parallel sidewalls 39, 41. Sidewalls 39, 41 are spaced apart a distance slightly less than the width of screwdriver bits 13, 15 and diameter of chuck key handle 21 to provide a resilient frictional interference fit with a bit 13 or handle 21 stored in cavity 33. Cavity 35 is constructed identically to cavity 33 and is comprised of an arcuate bottom wall 43 and parallel sidewalls 45, 47.

In accordance with the invention, the retainer further comprises a third cavity perpendicular to and intersecting the first and second cavities, said third cavity for receiving a chuck key spindle. As embodied herein, a third cavity is provided in base 25 and is perpendicular to and intersecting cavities 33, 35. As shown in FIG. 3, cavity 49 is for receiving a second chuck key portion, namely, spindle 23 for storage of key 17. Cavity 49 preferably includes a first central segment 51, a second segment 53 adjacent to one end of the first segment 51, and a third segment 55 adjacent to the other end of the first segment 51. As depicted in FIGS. 5, 7, central segment 51 has (1) an opening 57 defined by a pair of opposed sidewalls 59, 61 and (2) an arcuate bottom wall 63. The spacing between sidewalls 59, 61 is slightly smaller than the diameter of arcuate bottom wall 63 to partially enclose and to provide a snap fit for chuck key spindle 23. The diameter of arcuate bottom wall 63 is chosen to be substantially equal to the diameter of spindle 23.

In accordance with the invention, central segment 51 constitutes a preferred means for retaining chuck key 17 in cavity 49 and in either the first or second cavities 33, 35. This means may also be constituted by (1) a spring or spring biased member provided in a sidewall of cavity 49, (2) a tight, resilient, interference fit in cavity 33 or cavity 35 or (3) a spring or spring biased member provided in cavities 33, 35.

Cavity 49 begins at a location 64 spaced from first cavity 33, extends from the location 64 across intermediate portions of the first and second cavities 33, 35 and ends at a second location 66 spaced from the second cavity 35. Also cavities 33, 35 extend on each side of third cavity 49.

The second segment 53 has an opening 65 defined by arcuate sidewalls 67, 68. To provide alternatively for ease of removal of a bit 15 stored in cavity 33 and to enable receipt of chuck key gear 69, opening 65 is substantially wider than first segment opening 57 and is substantially equal to the diameter of gear 69. Third segment 55 has an opening 71 defined by arcuate sidewalls 73, 75. Again to aid in removal of a screwdriver bit 15 from cavity 35 and to accommodate the chuck key gear 69, the third segment opening 71 is substantially wider than the first segment opening 57 and is substantially equal to the diameter of gear 69.

To store an additional screwdriver bit 79, a fourth cavity (FIGS. 5, 7) 81 may be provided in base 25 intermediate the first and second cavities 33, 35. Cavity 81 includes an opening 83 defined by a pair of parallel spaced sidewalls 85, 87 and an arcuate bottom wall 89. Sidewalls 85, 87 and bottom wall 89 are sized identically to sidewalls 39, 41 and bottom wall 37 of cavity 33 to provide a tight resilient, interference friction fit with a conventional screwdriver bit 79. At one end of cavity 81, an enlarged generally cylindrical recess 91 is formed to aid in removal of screwdriver bit 79 from cavity 81. Recess 91 is defined by a flat bottom wall 93 and an upwardly and outwardly sloping sidewall 95.

In use, retainer 11 is used for storing a chuck key 17 and a screwdriver bit 79 when used on power tool 27 equipped with a keyed chuck 29 and for storing up to three screwdriver bits 13, 15, 79 when used with power tool 27 equipped with a keyless chuck (not shown). To store a chuck key 17, chuck key spindle 23 is disposed in cavity 49 with key gear 69 diposed in the third segment 55 of cavity 49 and chuck key handle 21 is disposed in cavity 33 as shown in FIGS. 1-3. Alternatively, chuck key spindle 23 may be disposed in cavity 49 with the gear 69 disposed in the second segment 53 of cavity 49 and with the handle 21 disposed in cavity 35. Handle 21 is retained in cavities 33, 35 by a resilient frictional interference fit with sidewalls 39, 41 and sidewalls 45, 47 respectively. Chuck key spindle 23 is retained in cavity 49 by forcing spindle 23 between walls 59, 61 to dispose spindle 23 in engagement with bottom wall 63 to partially enclose spindle 23 below sidewalls 9, 61. Removal of chuck key 17 from cavity 49 and cavity 33 or cavity 35 is facilitated by gripping chuck key gear 69 disposed in either enlarged opening 65 or 71. Also, the end of spindle 23 projects slightly beyond the sidewall of retainer 11 further facilitating grasping of key 17 for removal from cavity 49. To store screwdriver bits 13, 15 in cavities 33, 35 the bits are simply press fitted respectively between sidewalls 39, 41 of cavity 33 in a resilient, frictional, interference fit and between sidewalls 45, 47 of cavity 35 in a resilient, frictional, interference fit. Removal of bit 13 from cavity 33 and bit 15 from cavity 35 is facilitated by inserting a finger into openings 65, 71, respectively.

To store a bit 79 in cavity 81, bit 79 is pressed fitted into a resilient, frictional, interference fit between sidewalls 85, 87 in the same manner as bits 13, 15 are received within cavities 33, 35 respectively. Removal of bit 79 is facilitated by insertion of a finger into recess 91.

It will be appreciated from the foregoing, that a retainer in accordance with the invention herein provides a secure, convenient and versatile storage receptacle for accessories typically used with a power screwdriver/drill. The versatility is achieved by the flexibility of using the retainer to store screwdriver bits when the tool is equipped with a keyless chuck and to store a screwdriver bit and a chuck key when the tool is equipped with a keyed chuck. This versatility is particularly advantageous because of the desire to sell the same tool factory equipped with either a keyed chuck or a keyless chuck. Furthermore, it is similarly frequently desirable to replace, depending on user preference, a keyed chuck with a keyless chuck or a keyless chuck with a keyed chuck. While it is known to store different types of accessories in the same retainer, the invention herein achieves this feature in a minimum of space by the design of cavities 33, 35 to accommodate either a screwdriver bit or a chuck key handle.

It will be apparent to those skilled in the art that various modifications and variations can be made in the retainer of the present invention without departing from the scope and spirit of the invention. For example, a nonpreferred embodiment of the invention herein may be obtained by configuring cavity 49 to receive a chuck key handle and configuring cavities 33, 35 to receive a chuck key spindle 23 and gear 69. In this embodiment cavities 33, 35 would retain sidewall segments to provide a tight resilient friction fit with bits 13, 15. This embodiment is not preferred primarily because handle 21 and bits 13, 15 are approximately the same length and are, therefore, more readily interchangeably mounted in the same cavity. Additionally, handle 21 is substantially longer than spindle 23 and is far more easily accommodated longitudinally on elongated top wall 26 of power tool 27. Thus is intended that the present invention cover these modifications and variations provided they come within scope of the appended claims and their equivalents.

I claim:

1. A retainer for alternatively storing a screwdriver bit or a chuck key having two portions, said retainer comprising:
    a base;
    first and second parallel spaced cavities in the base for receiving either a screwdriver bit or one chuck key portion; and
    a third cavity perpendicular to and intersecting the first and second cavities, said third cavity for receiving the other chuck key portion.

2. A power tool for drilling and screwdriving comprising:
    a main body having a top wall;
    a handle extending from the main body; and
    a retainer inset in the top wall of the main body for alternatively storing a screwdriver bit or a chuck key having two portions, said retainer comprising:
    a base;
    first and second parallel spaced cavities in the base for receiving either a screwdriver bit or one chuck key portion; and
    a third cavity perpendicular to and intersecting the first and second cavities, said third cavity for receiving the other chuck key portion.

3. The retainer of claims 1 or 2 wherein the one chuck key portion is a handle and the other chuck key portion is the spindle.

4. The retainer of claim 3 wherein the third cavity has:
    a first central segment with an opening defined by a pair of opposed sidewalls;
    a second segment adjacent to one end of the first segment and having an opening defined by opposed sidewalls, said second segment opening substantially larger than the first segment opening; and
    a third segment adjacent to the other end of the first segment and having an opening defined by opposed side walls, the third segment opening substantially wider than the first segment opening.

5. The retainer of claim 4 wherein the opposed sidewalls of the central segment are spaced apart a smaller distance at the opening than near the bottom of the third cavity to partially enclose and provide a snap fit for a chuck key spindle.

6. The retainer of claims 1 or 2 further comprising a fourth cavity in the base intermediate the first and second cavities, said fourth cavity for receiving a screwdriver bit.

7. The retainer of claim 3 wherein the first and second cavities extend on each side of the third cavity.

8. The retainer of claim 5 wherein the second and third segment openings are, respectively, external to the region between the first and second cavities.

9. The retainer of claims 1 or 2 further comprising means for retaining a chuck key in the third cavity and in either the first or second cavities.

10. The retainer of claim 3 wherein the third cavity has a central segment with an opening, and a first outer segment on one side of the central segment with an opening substantially wider than the central segment opening.

11. The retainer of claim 10 wherein the third cavity has a second outer segment on the other side of the central segment with an opening substantially wider than the central segment opening.

12. The retainer of claim 10 wherein the first outer segment is external to the region between the first and second cavities.

13. The retainer of claim 3 wherein the third cavity begins at a location spaced from the first cavity, extends from said location across intermediate portions of the first and second cavities and ends at a second location spaced from the second cavity.

14. The tool of claim 2 wherein the top wall is elongated and the first and second cavities extend in the direction of elongation of the top wall.

* * * * *